United States Patent [19]

Tanaka

[11] Patent Number: 5,667,442

[45] Date of Patent: Sep. 16, 1997

[54] CHAIN LINK ASSEMBLY BODY

[75] Inventor: Koji Tanaka, Osaka, Japan

[73] Assignee: Tsubakimoto Chain Co., Osaka, Japan

[21] Appl. No.: 496,185

[22] Filed: Jun. 28, 1995

[30] Foreign Application Priority Data

Jun. 29, 1994 [JP] Japan ..................... 6-168571

[51] Int. Cl.$^6$ .................. F16D 3/54; F16D 3/70
[52] U.S. Cl. .......... 464/49; 59/5; 59/8; 464/70; 474/207; 474/229
[58] Field of Search ................ 464/49, 70, 87; 59/4, 5, 8; 474/207, 228, 229, 230, 226, 227; 384/296, 416

[56] References Cited

U.S. PATENT DOCUMENTS

| 1,965,145 | 7/1934 | Klaucke ........................ 464/49 |
| 2,155,584 | 4/1939 | Bryant et al. ................... 59/8 |
| 3,167,935 | 2/1965 | Fawick ........................ 464/49 |
| 3,948,574 | 4/1976 | Baylor ..................... 474/207 X |
| 4,290,236 | 9/1981 | Brewer et al. ................ 59/8 X |
| 4,926,529 | 5/1990 | Hosmer et al. ............... 59/5 X |
| 5,305,594 | 4/1994 | Wang ......................... 59/4 X |

FOREIGN PATENT DOCUMENTS

| 119898 | 9/1984 | European Pat. Off. ........... 59/5 |
| 1965395 | 1/1971 | Germany ..................... 59/4 |
| 3347340 | 7/1985 | Germany ..................... 59/4 |
| 53-71743 | 6/1978 | Japan ........................ 59/4 |
| 5-278064 | 10/1993 | Japan . |

Primary Examiner—Daniel P. Stodola
Assistant Examiner—Eileen A. Dunn
Attorney, Agent, or Firm—Armstrong, Westerman, Hattori, McLeland & Naughton

[57] ABSTRACT

A chain link 1 assembly body includes a pre-molded resin sleeve having a uniformly cylindrical inner periphery and a partially convexly contoured outer periphery, a bushing conformed to the shape of the sleeve and inner links each having a bushing press-fitted hole for fitting around the ends of the bushing. The method includes the step of providing an engineering plastic resin sleeve and a bushing. The sleeve is pre-molded to have a uniformly cylindrical inner periphery and an outer periphery having a convex contour for a central portion of the sleeve and uniformly cylindrical contours for the opposed ends of the sleeve. The bushing is originally uniformly cylindrical prior to its ends being press-fitted into bushing press-fitted holes of inner links. The sleeve is inserted in the bushing while the bushing is uniformly cylindrical in cross-section due to not having either of its ends press-fitted into bushing press-fitted holes of inner links (first embodiment), non-uniformly cylindrical in shape due to having one of its ends press-fitted into the bushing press-fitted hole of an inner link (second embodiment), or partially convexly contoured due to having both of its ends press-fitted into bushing press-fitted holes of inner links (third embodiment).

4 Claims, 4 Drawing Sheets

CHAIN LINK ASSEMBLY BODY

FIELD OF THE INVENTION

The present invention relates generally to high precise, wear-resistant chains, and more particularly, to improved chain link bodies which include more durable bushings due to the elimination of swelling stress, and thus possible creep deformation, on the bushings by elimination of the expansion of the bushings to conform to the partially convexly contoured sleeve inserted in the bushing.

BACKGROUND OF THE INVENTION

According to conventional technology, highly precise, wear-resistant chains, especially those having little stretch and no slack, are often formed by the use of chain link assembly bodies which include a sleeve inserted into a bushing. The current state of the art is defined by Japanese Laid-Open Patent Application Publication No. 5-278064 (A) to Koji Tanaka ("Tanaka") which teaches the manufacture of an inner link assembly having a resin sleeve over the peripheral surface of a bushing of a bushed chain.

FIGS. 1(A)–1(F) illustrate the method of the Tanaka reference. Referring to FIG. 1(A), Tanaka teaches a cylindrical roller R which is immersed in an electroless nickel bath B1 so that a thickly plated layer N is formed on the entire surface of the cylindrical roller. FIG. 1(B) shows the thickly plated cylindrical roller R loosely fitted outside a cylindrical bushing 2 and both of the end parts of the bushing 2 are press-fitted into the connecting pin insertion holes 1' of the inner links 1. FIG. 1(C) shows both of the end surfaces of the cylindrical roller R which are snugly put into press-fitting contact with the inside surfaces of the inner links 1, a cylindrical space δ defined between the inner peripheral surface of the cylindrical roller R and the outer peripheral surface of the bushing 2, and an injection hole P for press-injecting resin into the space δ made penetratingly in the side of the inner link. In FIG. 1(D), the inner link assemblies are inserted into a mold M and, following this, heat-melted resin is poured into the cylindrical space δ from the injection hole P by injection molding.

The Tanaka reference states its purpose as to avoid the occurrence of deflected abrasion and hence, increase the abrasive life of the sleeve by press-fitting a bushing into the connecting pin insertion hole of an inner link for making them up into an inner link assembly and thereafter by forming molten resin integral with the bushing peripheral surface through injection molding.

The method taught by Tanaka has the problem of producing a swelling stress on the bushing from the formation of the bushing's convex contour by expansion. The injection molding of the resin into the bushing creates a further swelling stress due to the injection pressure at the time of press-fitting the bushing into the coupling pin insert holes of the inner links. Upon leaving the mold, a restorative stress is produced which attempts to return the bushing to its original unexpanded state. Thus, creep destruction is introduced to the bushing which considerably decreases the durability of the bushing.

The present invention solves the problems of the prior art by providing an improved chain link assembly body having a more durable bushing and a method of forming a chain link assembly body wherein the bushing need not be expanded in order to eliminate possible creep deformation of the bushing. The method includes providing a pre-molded resin sleeve having a uniformly cylindrical inner periphery and an partially convexly contoured outer periphery which is inserted into a bushing wherein prior to insertion the bushing may be uniformly cylindrical in cross-section due to not having either of its ends press-fitted into coupling pin insert holes of inner links (first embodiment), non-uniformly cylindrical in shape due to having one of its ends press-fitted into the coupling pin insert hole of an inner link (second embodiment), or partially convexly contoured due to having both of its ends press-fitted into coupling pin insert holes of inner links (third embodiment).

According to the present invention, a resin sleeve is molded into a uniformly cylindrically shaped inner periphery and a partially convexly contoured outer periphery prior to being inserted into a bushing. Thus, when the sleeve is pre-molded, there is no injection pressure imposed on the bushing because there is no need for injection molding of the resin sleeve. Therefore, there is no restoring pressure attempting to return the bushing to its originally unexpanded and non-convexly contoured state and there is no creep deformation stress imposed on the bushing.

It is an object of the present invention to provide an engineering plastic resin sleeve, which has been molded into a shape having an uniformly cylindrical inner periphery and an outer periphery having a convexly contoured central portion and two opposed, uniformly cylindrically contoured end portions prior to the sleeve's insertion into the bushing. The pre-molded sleeve is elastic enough so that when inserted into the bushing, the bushing is not expanded as was the case in the prior art. Thus, there is no swelling pressure imposed on the bushing by insertion of the sleeve and the bushing will not be subjected to any restoring stresses attempting to return the bushing to its original state from an expanded state so that creep deformation is eliminated. This will, in turn, prolong the life of the bushing by maintaining the bushing's durability.

SUMMARY OF THE INVENTION

The present invention provides an improved chain link assembly body and a method of forming a chain link assembly body. The chain link assembly body includes a sleeve, a bushing and inner links each having centrally located bushing press-fitting holes. The sleeve is molded of an engineering plastic resin to have a uniformly cylindrical inner periphery and an outer periphery that is convexly contoured for a central portion of the sleeve and uniformly cylindrically shaped for opposed end portions of the sleeve on either side of the central portion. The bushing is originally uniformly cylindrical with an inner diameter slightly greater than or equal to the largest outer diameter of the central portion of the sleeve in order to allow the sleeve to be inserted into the bushing without causing any swelling or expansion stresses on the bushing. The ends of the bushing are press-fit into the bushing press-fitting holes of the inner links in order to allow the bushing to conform to the outer periphery of the sleeve.

The method includes the steps of providing a sleeve and a bushing. The sleeve is pre-molded of resin to have an inner periphery which is cylindrical and an outer periphery which is convexly contoured for a central portion of the sleeve and uniformly cylindrically contoured for opposed end portions of the sleeve. The central convexly contoured portion of the sleeve has its greatest diameter of a dimension no larger than the inner diameter of the bushing. In this way, when the sleeve is inserted in the bushing, the bushing is not expanded and thus, no stress is imposed on the bushing. The bushing is then conformed to the contour of the sleeve by press-fitting of the ends of the sleeve into bushing press-fitting holes in inner links.

The method of the present invention has three different embodiments. A first embodiment calls for the insertion of the sleeve in the bushing prior to press-fitting of the ends of the bushing in the bushing press-fitting holes in the inner links. A second embodiment calls for the press-fitting of one end of the bushing into the bushing press-fitting hole of a first inner link prior to insertion of the sleeve into the bushing through the end that is not press-fitted or the free end of the bushing, and then having the free end of the bushing press-fitted into the bushing press-fitted hole of a second inner link. The third embodiment calls for press-fitting of both ends of the bushing into the bushing press-fitting hole of respective inner links prior to the insertion of the sleeve in the bushing. This third embodiment especially requires that the sleeve be molded from a resin resilient enough to be able to pass the convexly contoured central portion of the sleeve through the end of the bushing which has been narrowed in diameter by the press-fitting of the end into the bushing press-fitting hole of the inner link. Furthermore, in passing the convexly contoured central portion of the sleeve through the narrowed diameter end of the bushing, there must be no stresses placed on either the bushing or the sleeve in order to avoid the creep deformation present in the prior art.

BRIEF DESCRIPTION OF THE DRAWING FIGURES

FIGS. 1(A)–1(F) depict the prior art method of manufacturing of an inner link assembly having a resin sleeve over a bushing peripheral surface of a bushed chain.

FIGS. 2(A), 2(B) and 2(C) show a first embodiment of the present invention's method of manufacturing a link assembly by fitting a sleeve into a bushing, before press-fitting both ends of the bushing into a bushing press-fitting hole of an inner link.

FIGS. 3(A), 3(B), 3(C) and 3(D) show a second embodiment of the present invention's method of manufacturing a link assembly by press-fitting one end of a bushing into a bushing press-fitting hole of a inner link, inserting a resin sleeve into the bushing, and then press-fitting the other end of the bushing into a bushing press-fitting hole of a second inner link. FIGS. 4(A), 4(B) and 4(C) show a third embodiment of the present invention's method of manufacturing a link assembly by fitting a sleeve into a bushing after press-fitting both ends of the bushing into bushing press-fitting holes of two inner links.

DETAILED DESCRIPTION OF THE INVENTION

Figure 1A:
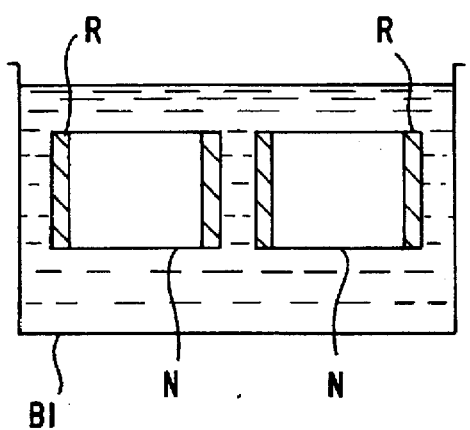
Figure 1B:
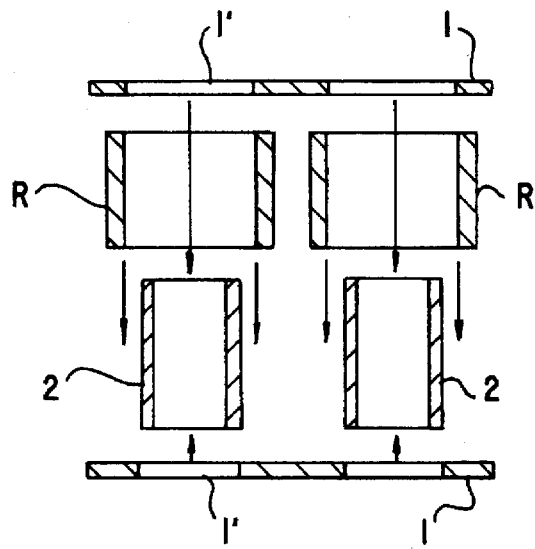
Figure 1C:
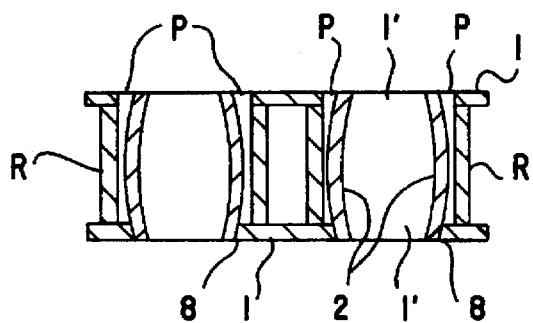
Figure 1D:
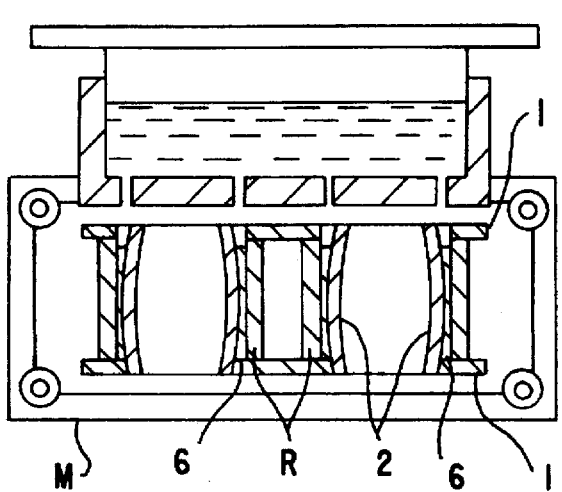
Figure 1E:
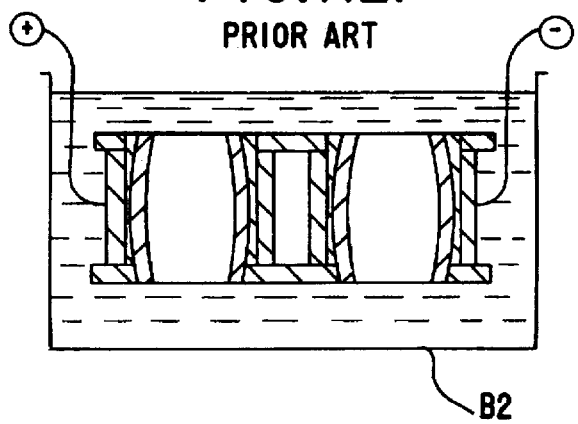
Figure 1F:
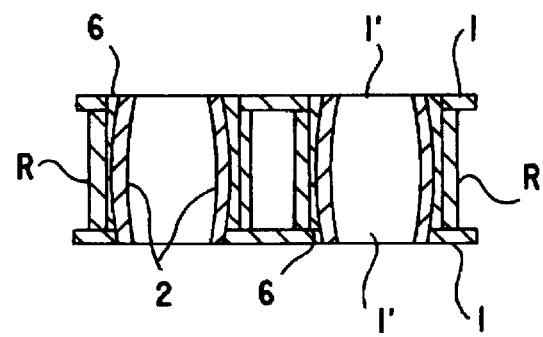
Figure 2A:
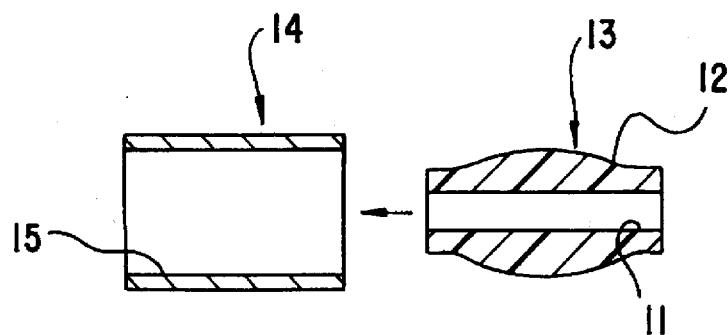
Figure 2B:
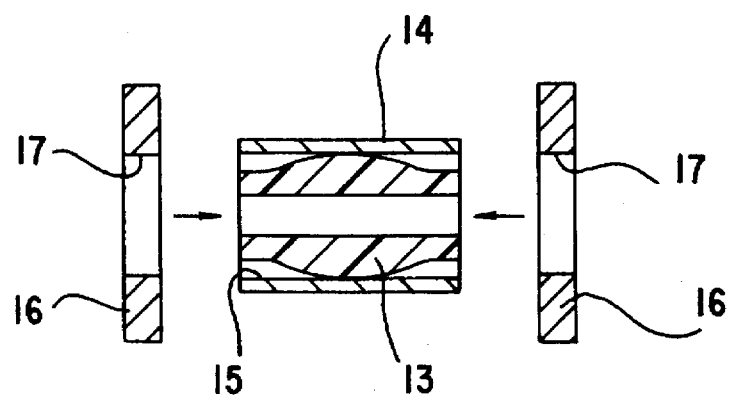
Figure 2C:
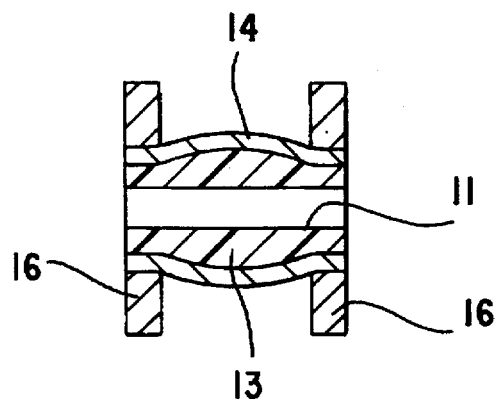

The drawing figures illustrate an improved method of forming a chain link assembly body. Referring to FIGS. 2(A), 2(B) and 2(C), a first embodiment of the present invention is shown.

FIG. 2(A) illustrates an engineering plastic resin sleeve 13 and a bushing 4. The resin sleeve 13 of the present invention is preferably made of polyamide, polyacetal, polyethelethelketone(PEEK), polyimide or phenol resin and is molded prior to insertion of the sleeve 13 in the bushing, unlike the above-mentioned prior art methods which require injection molding of the resin sleeve 13 in the bushing 14. More particularly, the resin sleeve 13 has been molded to have an inner periphery 11 which is uniformly cylindrical in shape and an outer periphery 12 which has a convex contour for a central portion of the sleeve 13 and a uniformly cylindrical portion for the opposed end portions of the sleeve 13. Furthermore, the resin sleeve 13 is molded so that the largest diameter of the convexly contoured central portion is somewhat less than or equal to the diameter of the inner periphery 15 of the bushing 14.

The bushing 14 is preferably made of polyamide, polyacetal, polyethelethelketone(PEEK), polyimide or phenol resin and has an originally uniformly cylindrical contour with a cylindrical inner periphery 15 and a cylindrical outer periphery. The inner periphery 15 of the bushing 14 is greater than or equal to the largest diameter of the convexly contoured central portion of the resin sleeve 13. An arrow shows the direction of insertion of the sleeve 13 into the bushing 14.

FIG. 2(B) depicts the sleeve 13 after being inserted into the cylindrical inner periphery 15 of the bushing 14 and prior to insertion of the ends of the bushing 14 into the bushing press-fitting holes 17 of the inner links 16. The inner links 6 are preferably made of polyamide, polyacetal, polyethelethelketone(PEEK), polyimide or phenol resin.

FIG. 2 (C) shows the bushing 14 after having both of its ends press-fitted into the bushing press-fitting holes 17 of the inner links 16. The central part of the bushing 14 is not swelled or expanded radially outwardly to form a convex contour of the sleeve 13 as is conventionally done. Rather, the convex contour of the bushing 14 is caused by an external press-fitting force on the ends of the bushing 14 which makes the inner periphery 15 of the bushing 14 conform and closely touches the outer periphery of the sleeve 13 which is convexly contoured for the central portion of the sleeve 13 and cylindrically contoured for the end portions of the sleeve 13. Thus, the result of having both ends of the bushing 14 press-fitted into bushing press-fitting holes 17 of respective inner links 16 is the formation of an inner link assembly body of a chain.

Figure 3A:
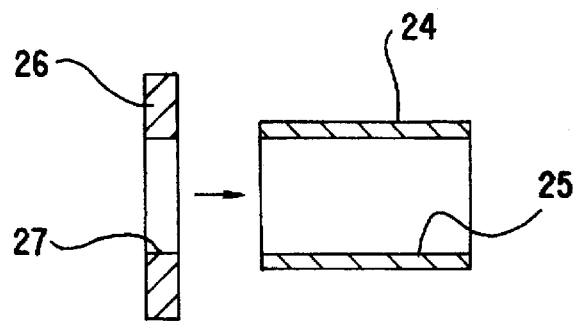
Figure 3B:
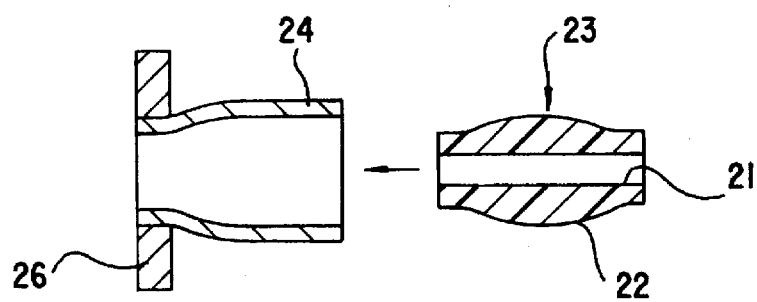
Figure 3C:
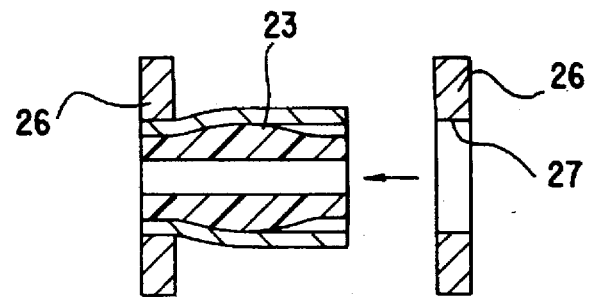
Figure 3D:
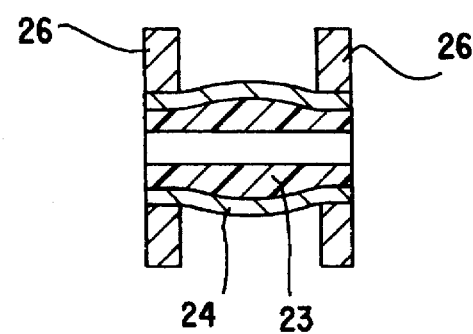

Referring to FIGS. 3(A), 3(B), 3(C) and 3(D), a second embodiment of the present invention is shown. FIG. 3(A) shows an uniformly cylindrical bushing 24 which is about to be press-fitted into the bushing press-fitting hole 27 of an inner link 26. FIG. 23(B) shows a resin sleeve 23 which has been pre-molded so that its inner periphery 21 is cylindrically shape and its outer periphery 22 is partially convexly contoured prior to the sleeve's insertion into the bushing 24. FIG. 3(C) shows the other end of the bushing 24 about to be press-fitted into a bushing press-fitting hole 27 of a second inner link 26. FIG. 3(D) shows a finished inner link assembly body.

Figure 4A:
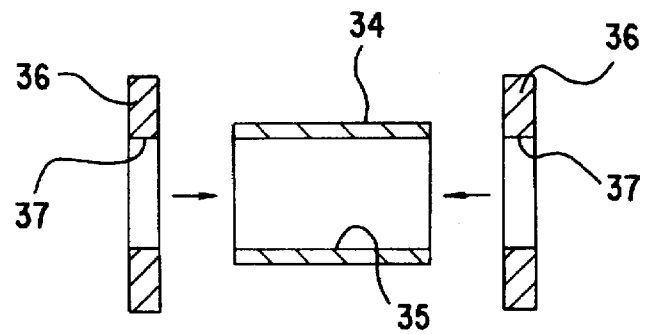
Figure 4B:
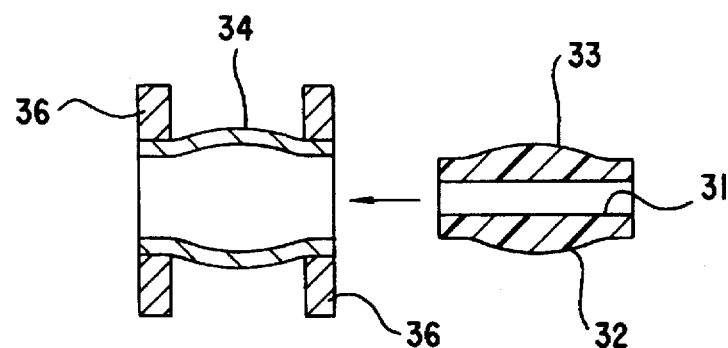
Figure 4C:
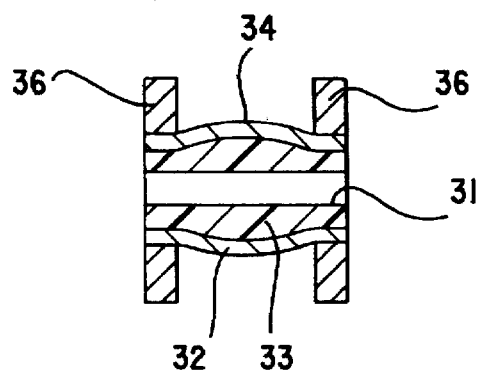

Referring to FIGS. 4(A), 4(B) and 4(C), a third embodiment of the present invention is shown. FIG. 4(A) shows the cylindrical bushing 34 and two inner links e located on each side of the bushing 34 near the opposite ends of the bushing 34. Each of the inner links 36 have a centrally located bushing press-fitting hole 37 for press-fitting of the ends of the bushing 34 therein.

In FIG. 4(B), the bushing 34 is shown after its ends have been press-fitted into the bushing press-fitting holes 37 of the inner links 36 and prior to the insertion of the pre-molded resin sleeve 33 into the bushing. The sleeve 33 is preferably made of (what kind of resin?) so that the sleeve is elastic enough to be inserted into the bushing 34 after the ends of the bushing 4 have been press-fitted into the bushing press-fitting holes of the inner links to transform the bushing 34 into its partially convexly contoured shape.

It will be noted that the resin sleeve 33 is required to be especially elastic because of the difference between the inner diameter of the end of the bushing 34 once transformed into having a convex contour and the outer diameter of the convexly contoured central portion of the sleeve 33.

However, since the deformation stress at the time of said press-fitting is eliminated by elasticity restoration after insertion because of hysteresis of the material, creep destruction stress does not exist. As a result, it is inserted inside the bush as shown in FIG. 4(C).

Although the embodiment specifically described above relates to an inner link assembly body, the present invention can be applied to a kind of chain that does not distinguish between an inner or outer chain such as, for example, an off-set chain. The present invention has been shown in the drawing figures and described in detail in its preferred embodiment for the purposes of illustration, however, variations and departures can be made therefrom by one of ordinary skill in the art without departing from the spirit and scope of the invention as claimed below.

What is claimed is:

1. A chain link assembly body, comprising;

a molded resin sleeve having two ends, a cylindrical inner periphery and an outer periphery that is convexly contoured at a central portion of said sleeve and uniformly cylindrically shaped at the end portions of said sleeve, and a convex bushing surrounding said sleeve wherein said bushing has two ends and an inner cross-sectional diameter that is at least equal to said convexly contoured outer periphery of said central portion of said sleeve;

first and second members wherein each of said members has a centrally located bushing press-fitting hole, wherein said first and second members are press-fitted around said ends of said bushing in order to conform said bushing to said outer periphery of said sleeve.

2. The chain link assembly body of claim 1 wherein said members are each inner links of said chain link assembly.

3. A chain link assembly body, comprising;

a molded resin sleeve having two ends, a cylindrical inner periphery and an outer periphery that is convexly contoured at a central portion of said sleeve and uniformly cylindrically shaped at end portions of said sleeve; and a convex bushing surrounding said sleeve and having two ends and an inner periphery that conforms to said outer periphery of said sleeve;

first and second members each having a centrally located bushing press-fitting hole having a diameter greater than the outer periphery of said cylindrical end portions of said sleeve and fitted around said ends of said bushing.

4. The chain link assembly body of claim 3 wherein said members are each inner links of said chain link assembly.

* * * * *